(12) United States Patent
Berthold

(10) Patent No.: US 7,712,757 B2
(45) Date of Patent: May 11, 2010

(54) SUSPENSION FOR MOUNTAIN BICYCLES

(75) Inventor: Brian David Berthold, 5174 Herbemont Rd., Martinsville, IN (US) 46151

(73) Assignees: Kona USA, Inc., Ferndale, WA (US); Brian David Berthold, Martinsville, IN (US)

( * ) Notice: Subject to any disclaimer, the term of this patent is extended or adjusted under 35 U.S.C. 154(b) by 0 days.

(21) Appl. No.: 12/143,650

(22) Filed: Jun. 20, 2008

(65) Prior Publication Data
US 2009/0315296 A1 Dec. 24, 2009

(51) Int. Cl.
*B62K 3/02* (2006.01)
(52) U.S. Cl. ...................................... 280/284
(58) Field of Classification Search ................ 280/283, 280/284, 285, 286
See application file for complete search history.

(56) References Cited

U.S. PATENT DOCUMENTS

| | | | | |
|---|---|---|---|---|
| 4,789,174 A | * | 12/1988 | Lawwill | 280/284 |
| 5,205,572 A | * | 4/1993 | Buell et al. | 280/284 |
| 5,217,241 A | | 6/1993 | Girvin | |
| 5,409,249 A | * | 4/1995 | Busby | 280/284 |
| 5,628,524 A | | 5/1997 | Klassen et al. | |
| 6,036,213 A | | 3/2000 | Busby | |
| 6,102,421 A | * | 8/2000 | Lawwill et al. | 280/284 |
| 6,164,676 A | | 12/2000 | Wilcox | |
| 6,203,042 B1 | | 3/2001 | Wilcox | |
| 6,361,059 B1 | | 3/2002 | Ellsworth | |
| 6,450,521 B1 | | 9/2002 | Turner | |
| 6,471,230 B2 | | 10/2002 | Ellsworth et al. | |
| 6,488,301 B2 | | 12/2002 | Klassen et al. | |
| 6,866,281 B2 | | 3/2005 | Chamberlain et al. | |
| 6,926,298 B2 | | 8/2005 | Ellsworth et al. | |
| 6,969,081 B2 | | 11/2005 | Whyte | |
| 7,059,620 B2 | | 6/2006 | Chamberlain et al. | |
| 7,066,481 B1 | | 6/2006 | Soucek | |
| 2003/0038450 A1 | | 2/2003 | Lam | |
| 2004/0094933 A1 | * | 5/2004 | Probst | 280/284 |
| 2005/0253357 A1 | * | 11/2005 | Chang et al. | 280/283 |
| 2007/0108725 A1 | | 5/2007 | Graney | |
| 2008/0238030 A1 | * | 10/2008 | Tseng | 280/284 |
| 2008/0238031 A1 | * | 10/2008 | Tseng | 280/284 |
| 2009/0045601 A1 | * | 2/2009 | Colegrove et al. | 280/284 |

FOREIGN PATENT DOCUMENTS

EP 0668209 A1 8/1995

* cited by examiner

*Primary Examiner*—Tony H. Winner
(74) *Attorney, Agent, or Firm*—Seed IP Law Group PLLC

(57) ABSTRACT

A rear wheel suspension for bicycles has a link connecting the chainstay, or swingarm, to the lower damper or shock absorber mount. This link allows the requirements of the rider to manipulate the suspension and geometry available for various conditions. In this way, the suspension characteristics, such as spring rate, rising rate, and wheel travel, will automatically change in accordance with the rider's needs.

15 Claims, 15 Drawing Sheets

SUSPENSION FOR MOUNTAIN BICYCLES

TECHNICAL FIELD

The invention relates to the field of bicycle suspensions and geometry and more particularly mountain bicycle suspensions.

BACKGROUND

As mountain bike suspension has evolved, several problems exist, some due to the unique requirements inherent in pedal powered vehicles that are required to perform in varied and diverse conditions. One of these problems is the desire to have different suspension characteristics while under power or forward acceleration (such as "anti-squat", or in the particular case of the pedal/crank powered bicycle, to be firmer/stiffer while pedaling), especially while traversing smooth ground and/or climbing, when the rider weight bias is to the rear, while retaining the ability to absorb bumps when the wheel encounters a bump.

Another problem is to retain desirable suspension action while braking, especially when traversing a steep downhill section, where all the rider weight is toward the front of the bike, and the rear suspension is relatively unloaded. A different spring rate and/or compression and rebounding damping characteristics are desirable during these conditions.

Yet another problem is the conflicting frame geometry requirements of climbing versus descending. These conflicting frame geometry requirements are true of both suspension and non-suspension bikes such as road bikes. Typically, while climbing on a bicycle, a steep fork and seat tube angle (closer to vertical) are an advantage, not only to keep weight on the front wheel, (at a time when the rider's weight is naturally more to the rear), which aids steering control and prevents the unwanted "wheelie", but also to position the rider more favorably over the pedals, for better power transfer, with less effort to stay over the cranks, which in turn allows better power transfer from the rider. Conversely, while descending and braking, a slack fork and seat tube angle (less vertical) are an advantage. This aids stability at a time when weight is unavoidably transferred to the front. This can also help minimize this weight transfer at a time when the rider's weight distribution is already tending toward the front due to the angle of descent.

Thus, regardless of the intended use of a bicycle, a different geometry is desirable for climbing and/or hard pedaling than would be optimum for descending and/or braking.

Several designs currently available attempt to solve some of these problems. Each of these designs has negative behavior associated with them. One such design is commonly called an "inertia valve" shock absorber or damper or "brain" type dampers/shock absorbers. The inertia valve shock attempts to separate forces trying to compress the rear wheel relative to the frame. It uses a weighted mass inside the shock that bounces up and down during use. The theory is that this mass will move, or be biased in one direction when the rear wheel encounters a bump, and move or be biased in the other direction when the frame is trying to compress relative to the wheel due to pedaling forces, or rider weight shifts. The orientation of this mass, or inertia valve, then engages an alternate damping characteristic. This approach is characterized by so-called "brain" dampers or shock absorbers.

A number of problems are associated with this design. First, the wheel has to encounter a bump before the mass changes position, meaning the wheel will have a delay when encountering a bump, before the mass can move. This delay causes an unresponsive wheel when reacting to the bump force. Further, the mass can move in the wrong direction at the wrong time, causing the damping characteristics to be less than desirable under certain conditions. This results in harsh ride quality and/or loss of wheel contact and traction with the ground. This design offers no improvement during braking, and suffers the same negative effects mentioned previously.

A second design employs what has become commonly referred to as "stable platform" valving, or damping or pedaling platform type dampers/shock absorbers. This strategy attempts to utilize a different damping characteristic in response to different input frequencies. The theory is that a pedaling input force, or rider weight shift, is characterized by a different input frequency than a bump force, and therefore allows a "stiffer" shock or damping characteristic for those pedaling forces. The main problem with this design is that some bump forces are indeed similar or the same frequency as the input forces caused by rider pedaling or weight shifts. This results in the stiffer characteristic to be present under certain bump conditions, causing the wheel to be unresponsive during those bumps. This results in a harsh ride quality and/or loss of wheel contact and traction with the ground. This design offers no improvement during braking, and suffers the same negative effects mentioned above.

A third type of design can be characterized by what is commonly referred to as a "virtual pivot", "floating pivot", "instant center" or similar designation. These terms generally describe a suspension design where the rear swingarm to which the rear wheel is attached, is connected to the frame by two other links. These other links are positioned to provide the rear wheel with a wheel path, and (bump and pedaling) force response characteristic that is associated with a pivot in space other than a physical pivot on the bicycle. The location of this effective pivot is a function of the lengths and angular orientation of these links.

The main problems with this type of design can include wheel path compromises, spring and damper progression compromises and problems associated with the fact that the effective pivot location moves when the rear wheel travels in compression or rebound, potentially causing negative effects. A further problem for these designs occurs when the links are arranged in such a way to provide an anti-lift force under braking, in an attempt to counteract the rider/frame forward weight shift that accompanies braking events. This anti-lift force causes the rear wheel to compress relative to the frame, preloading the spring into a higher force level. This causes the rear suspension to be unresponsive to bump forces while braking. This results in harsh ride quality and/or loss of wheel contact and traction with the ground. None of the above designs attempts to address the issues of varying suspension travel and frame geometry.

None of the foregoing designs addresses the issues of varying suspension travel and frame geometry.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The present invention provides a suspension system that solves the problems noted above, without the negative side effects that are present with existing designs. Central to the solution is a novel link. This link allows the requirements of the rider to manipulate the suspension and geometry available for various conditions. This link is used to connect the chainstay, or swingarm, to the lower damper or shock absorber mount. In this way, the suspension characteristics, such as spring rate, rising rate, and wheel travel, will automatically change in accordance with the rider's needs. This happens without any extra input from the rider, such as flipping a lockout switch, or otherwise making some adjustment to compensate for various riding conditions. Additionally, the link allows changes to critical geometry factors, such as fork rake and seat tube angle, to occur automatically, when needed.

To review the desired traits of bicycle suspension: Stiffer suspension while pedaling, especially while climbing; Less suspension travel required while climbing; Steeper (more vertical) fork rake and seatube angle while climbing and hard pedaling; More forward weight bias while climbing; More progressive (plusher initial travel) suspension while encountering bumps, descending and/or braking; More suspension travel for bumps and descents; Less fork rake and seat tube angles (less vertical) during high speed bumps, descents, and during braking; More rearward weight bias while descending and/or braking.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figure disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The term "bicycle" used herein refers both to chain-driven pedal-powered bicycles and chain-driven motor-powered bicycles or motorcycles. While the invention has particular utility for mountain bicycles, it is also useful for any type of chain-driven bicycle or motorcycle.

Figure 1:
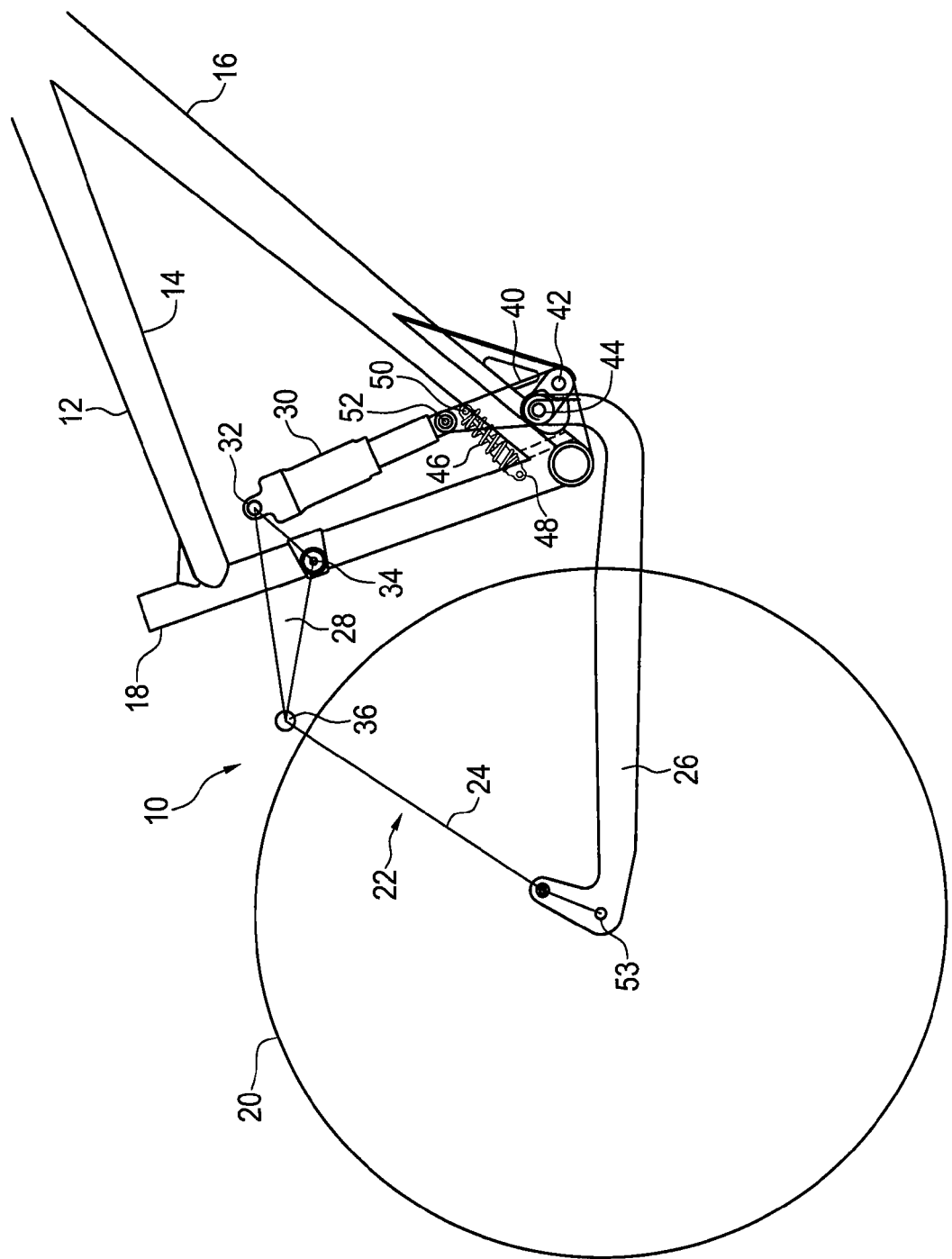
FIG. 1 is an elevation view showing the bicycle suspension of the invention under power or forward acceleration with the suspension fully extended.

With reference to FIG. 1, a rear wheel suspension system is designated as 10 mounted on bicycle frame 12 consisting of a top tube 14, down tube 16 and seat tube 18. Rear wheel 20 rotates on an axle (not shown) which is mounted at 53 on the chainstay 26 which is connected to a pair of seat stays 24 and a pair of chain stays 26. Rocker arm 28 pivots on the seat tube 18 at 34 and pivotally links seat stay 24 at pivot axis 36 and shock absorber 30 at pivot axis 32. A second lower link 40 pivots on frame 12 at 42 and is pivotally connected to the lower end of shock absorber 30 at 52. Chainstay 26 pivotally connects to the second lower link 40 at 44. A spring 46 has one end that is connected to the frame 12 at 48 and at the other end to the second lower link 40 at 50

Figure 6:
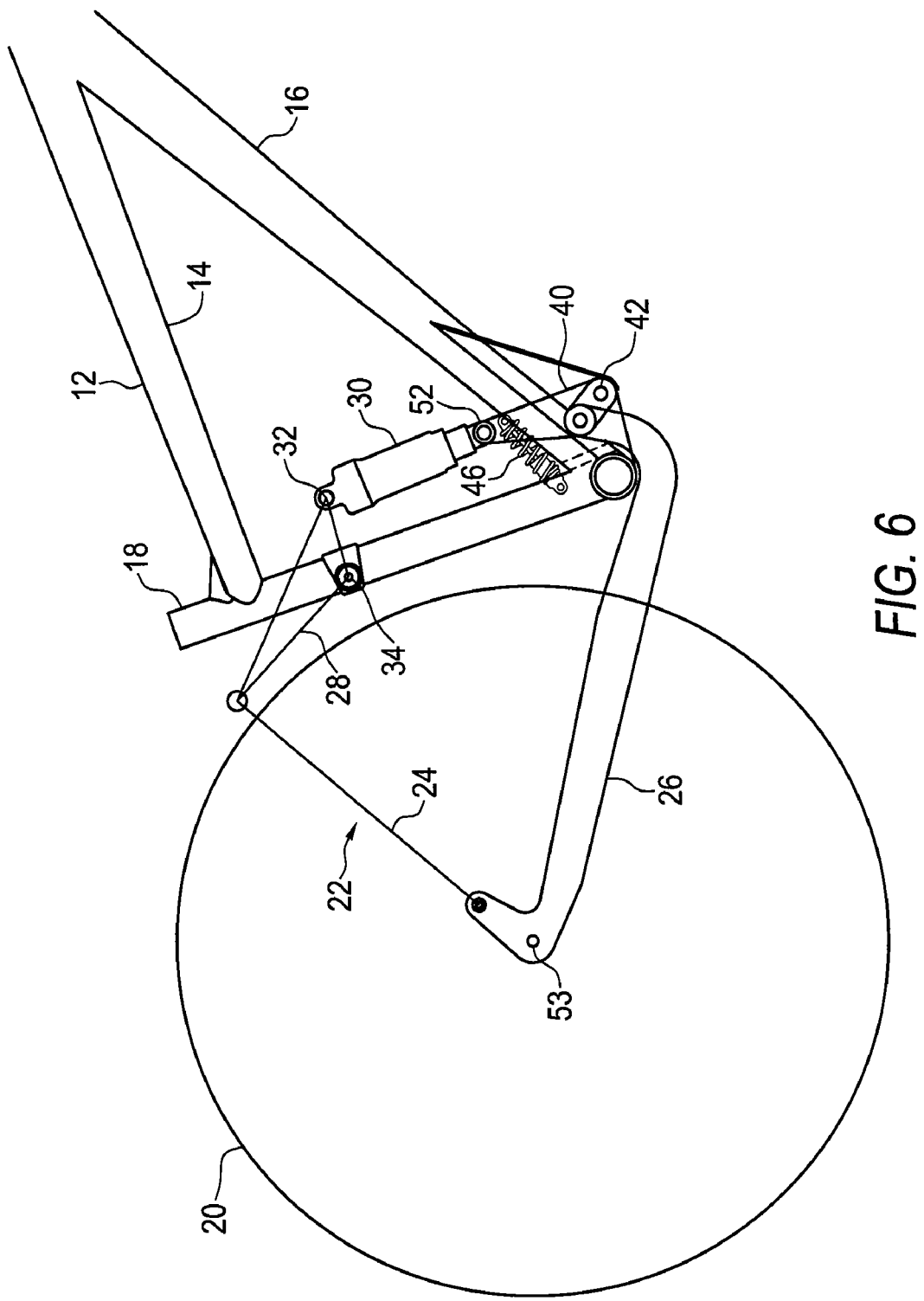
FIG. 6 is an elevation view showing the bicycle suspension of the invention under power or forward acceleration with the main shock compressed due to a bump.
Figure 7:
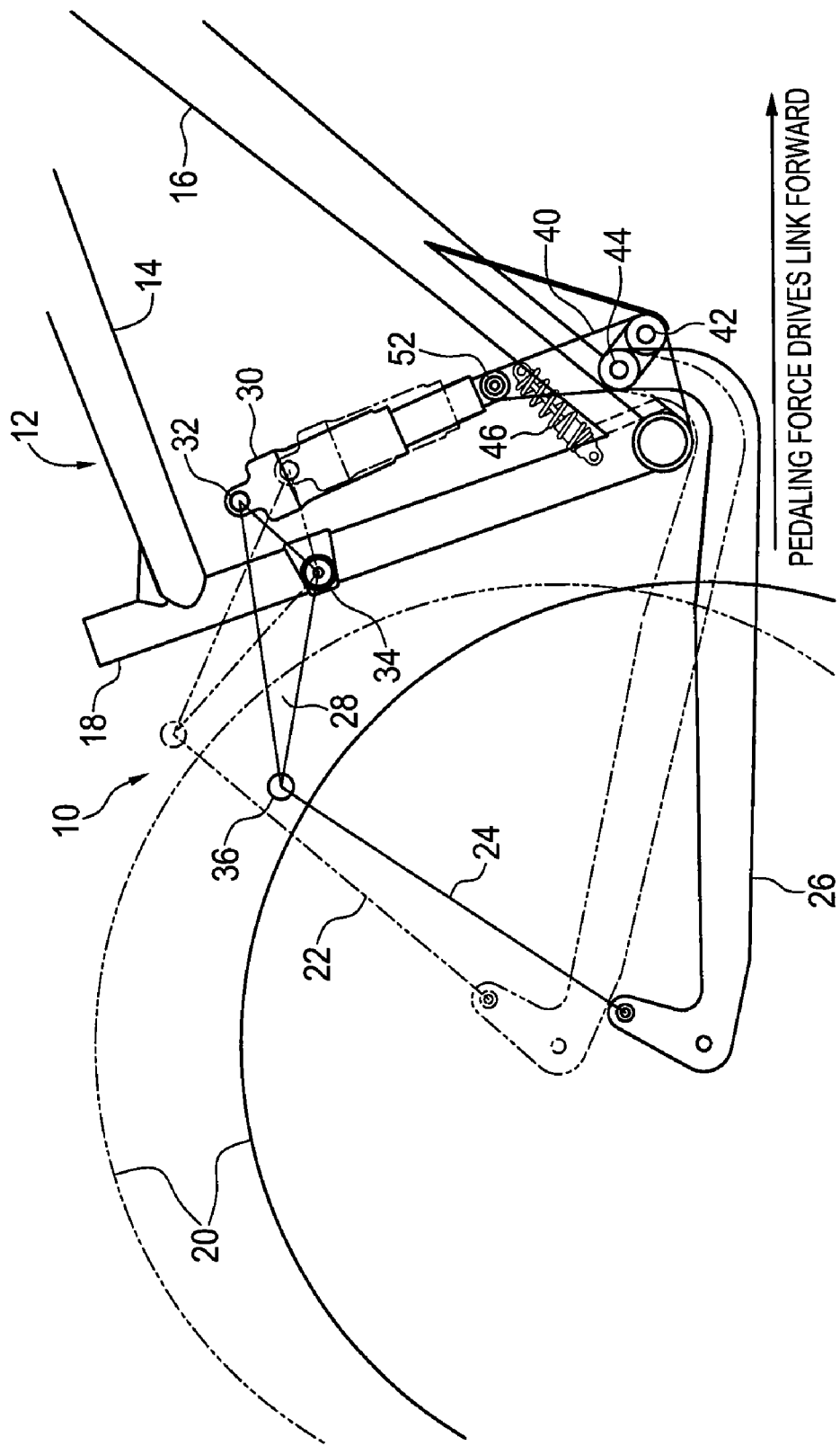
FIG. 7 is an elevation view showing the bicycle suspension of the invention under power or forward acceleration with the main shock compressed due to a bump in phantom for comparison to the fully extended position.
Figure 15:
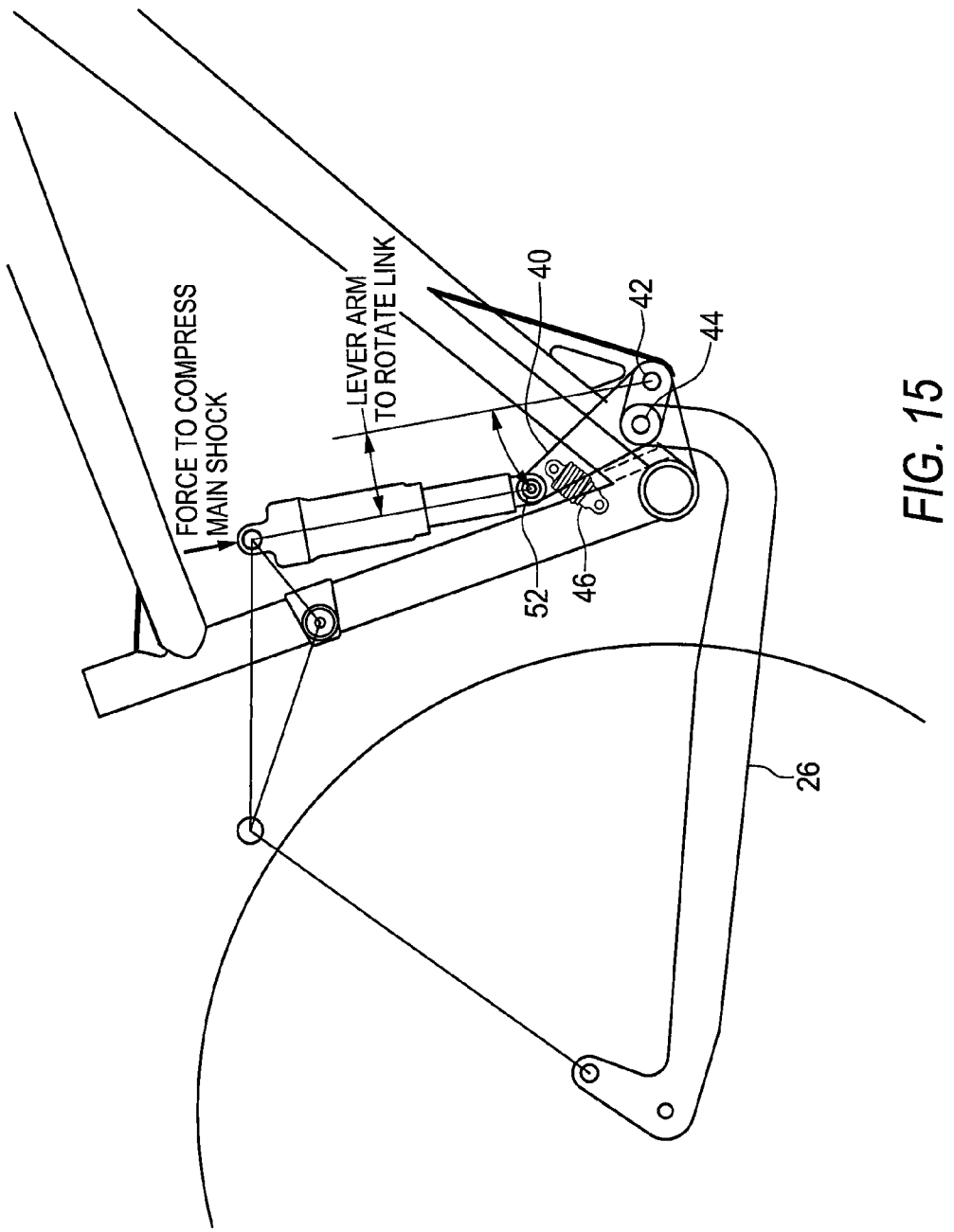
Figure 16:
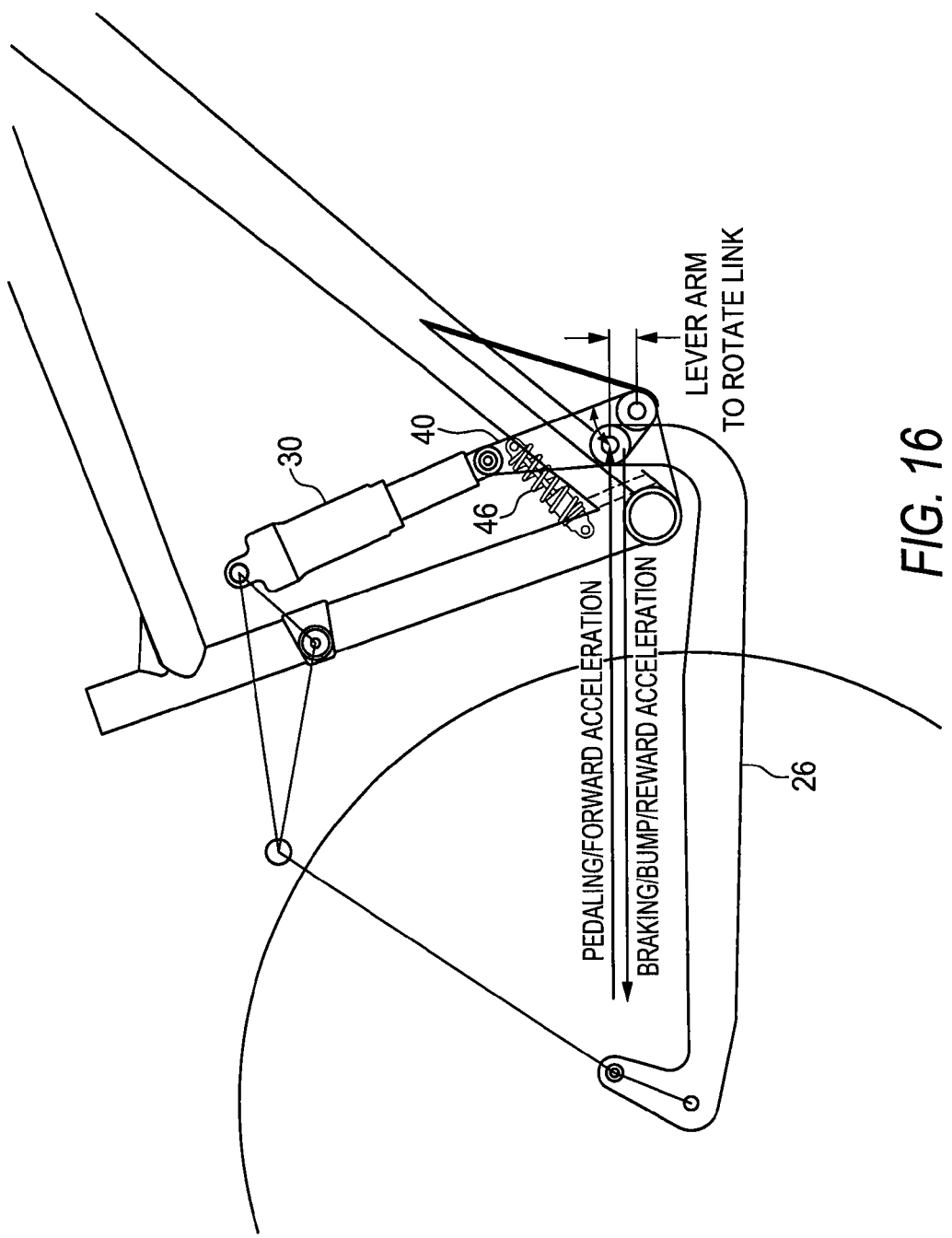

When pedaling power is applied, as shown in FIG. 16 the chain pull and reaction force at the tire/ground interface pushes the wheel 20 and swing arm 22 forward relative to the frame 12 to the position shown in FIG. 15, from the spring 46 being at rest, to the position shown in FIG. 16 with the spring 46 extended. This forces the upper end of link 40 forward, with the lower shock mount 50 along with it, as also shown in FIGS. 1, 6 and 7. When the lower shock mount 50 moves forward, it also moves upward. This changes the motion ratio and rising rate characteristics of the shock 30 to become stiffer in the initial part of the travel. It also causes a steeper (more vertical) fork rake and seat tube angle, and places the rider in a more aggressive position over the pedals, and moving the rider weight bias to the front. The harder the pedaling effort, the more this link 40 wants to keep in the forward position.

Figure 2:
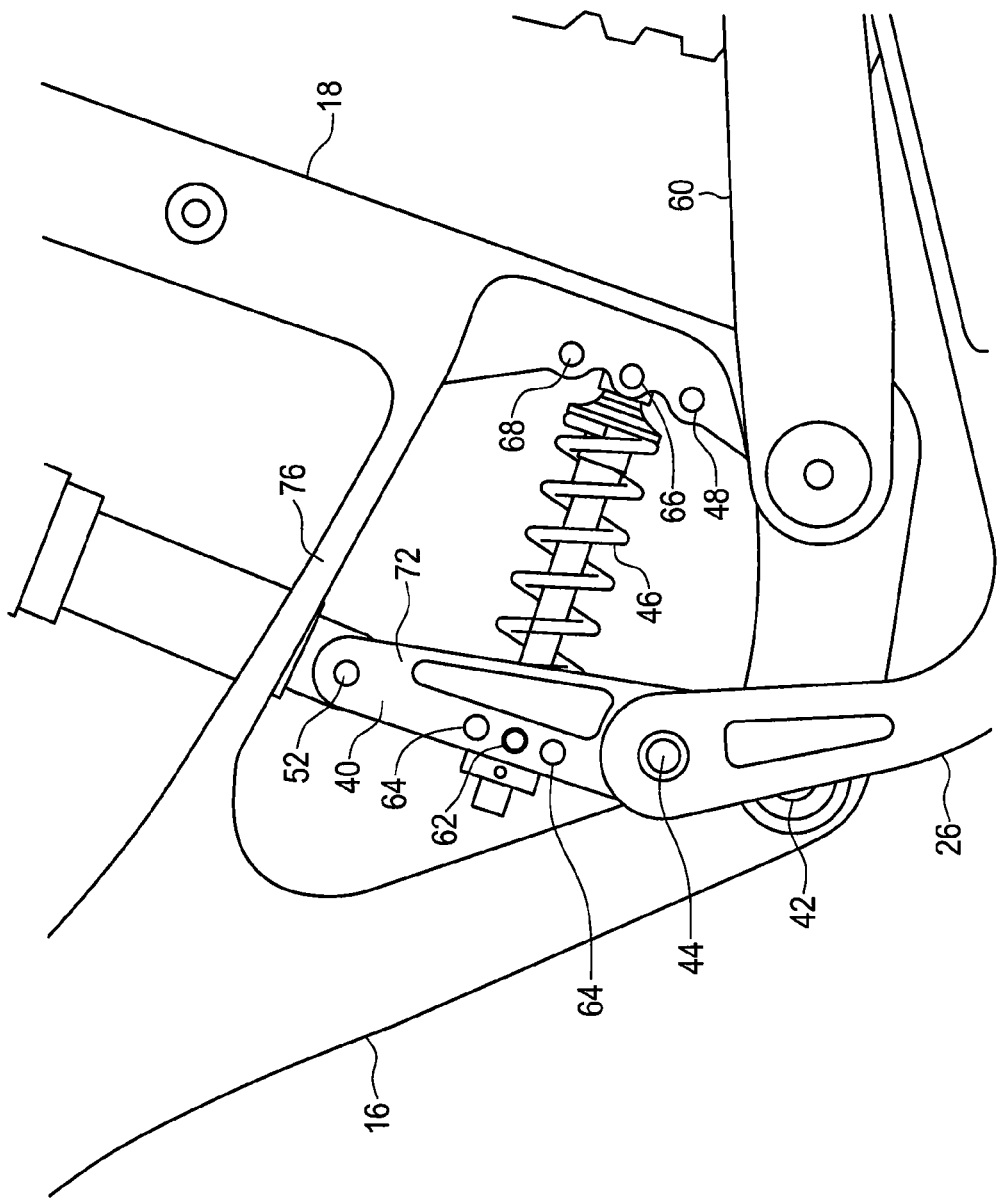
FIG. 2 is a detail elevation view showing an embodiment of the link of the bicycle suspension of the invention.
Figure 3:
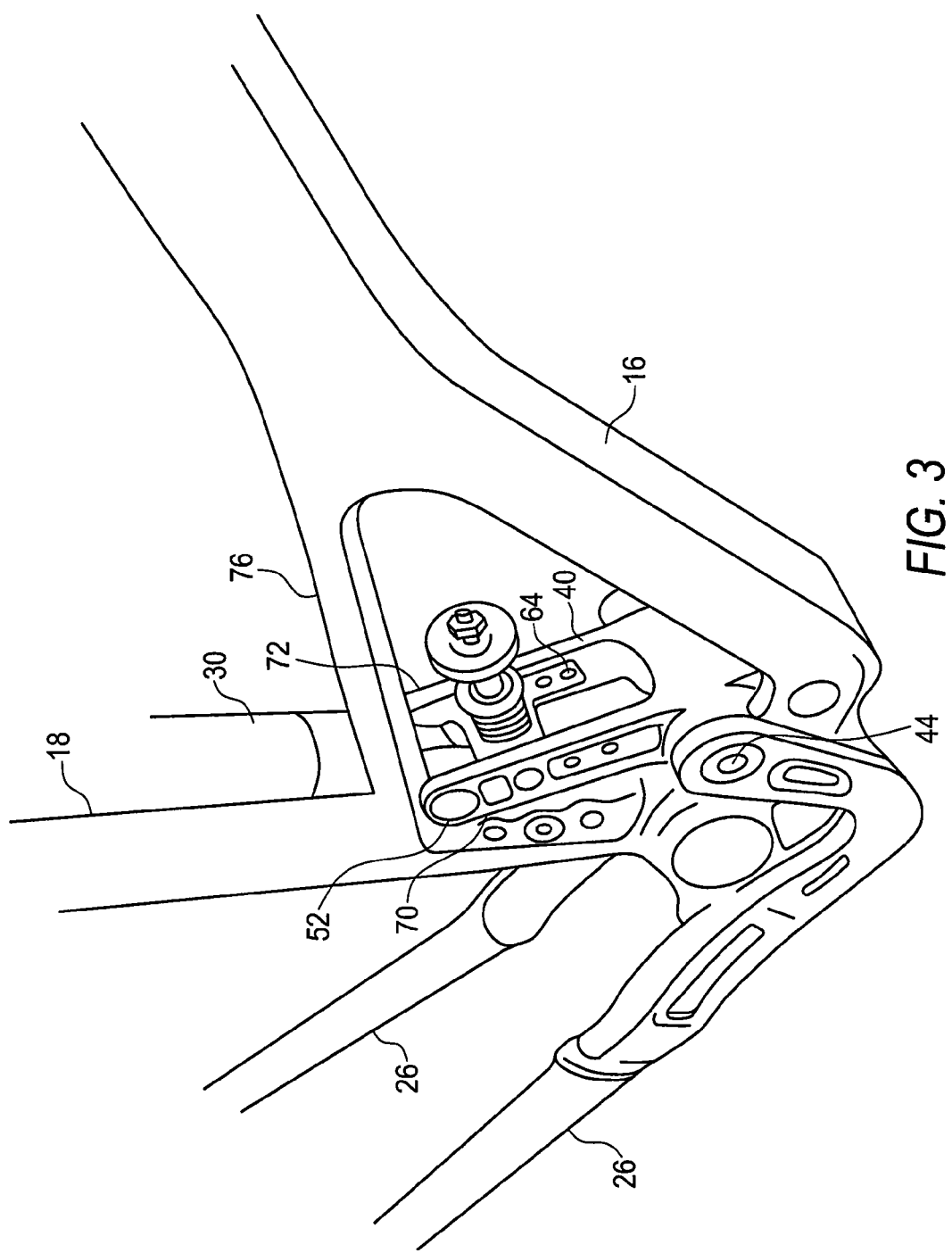
FIG. 3 is a perspective view showing the link of the bicycle suspension of the invention.
Figure 5:
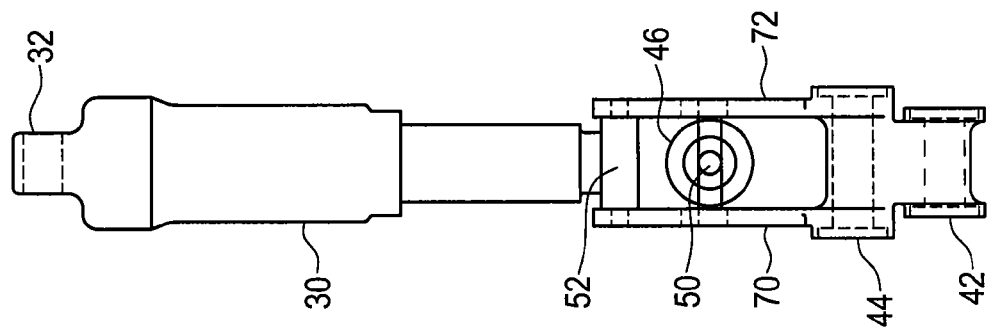
FIG. 5 is a front elevation view showing the link of the bicycle suspension of the invention in isolation.
Figure 4:
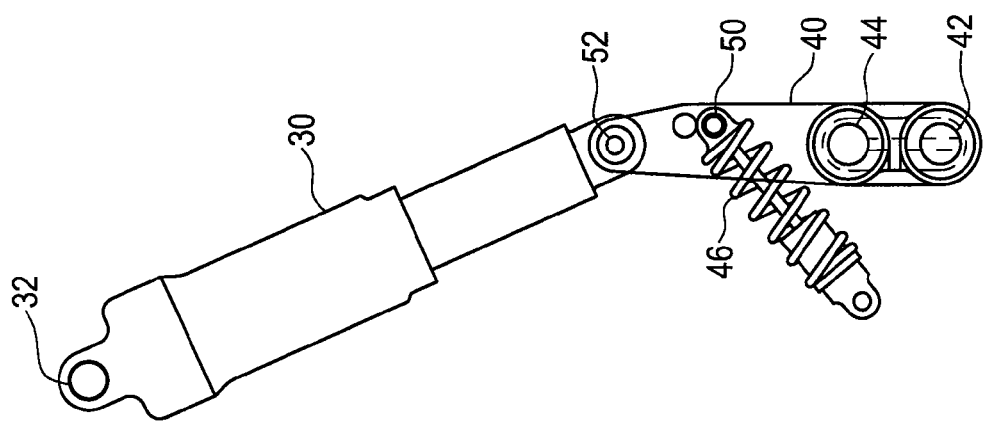
FIG. 4 is a side elevation view showing the link of the bicycle suspension of the invention in isolation.

FIG. 2 is a detail of link 40 illustrating the link 40 in the forward position, and shows a pedal arm 60. As illustrated the location of spring 46 can be adjusted by moving connectors 62 and 66 into different positioning holes 64, 68. This alters the suspension characteristics by altering the geometry. FIG. 3 illustrates the link 40 in perspective with the spring 46 in the topmost positioning holes 64. In this embodiment link 40 comprises two parallel forks 70, 72 through which spring 46 extends and which attach to the shock mount 50. Shock 30 extends through two parallel extensions 76 of down tube 16. FIGS. 4 and 5 are side and front elevation views respectively showing the link 40 of the bicycle suspension of the invention in isolation.

FIG. 1 illustrates that the bicycle suspension of the invention 10 under power or forward acceleration has a tendency to keep the link 40 forward. FIGS. 6 and 7 illustrates the effect of a bump on rear wheel 20 when the link 40 is in the forward position, compressing shock 30. FIG. 7 shows the two positions with the bump in phantom lines. Under power or forward acceleration the chain stay 26 and link 40 are driven forward, extending spring 46. The effect of additional bump forces is shown in FIG. 6 and in phantom outline in FIG. 7. As shown, when the rear wheel 20 encounters a bump with the link 40 in the forward position, the shock 30 absorbs the bump in a conventional fashion.

Figure 8:
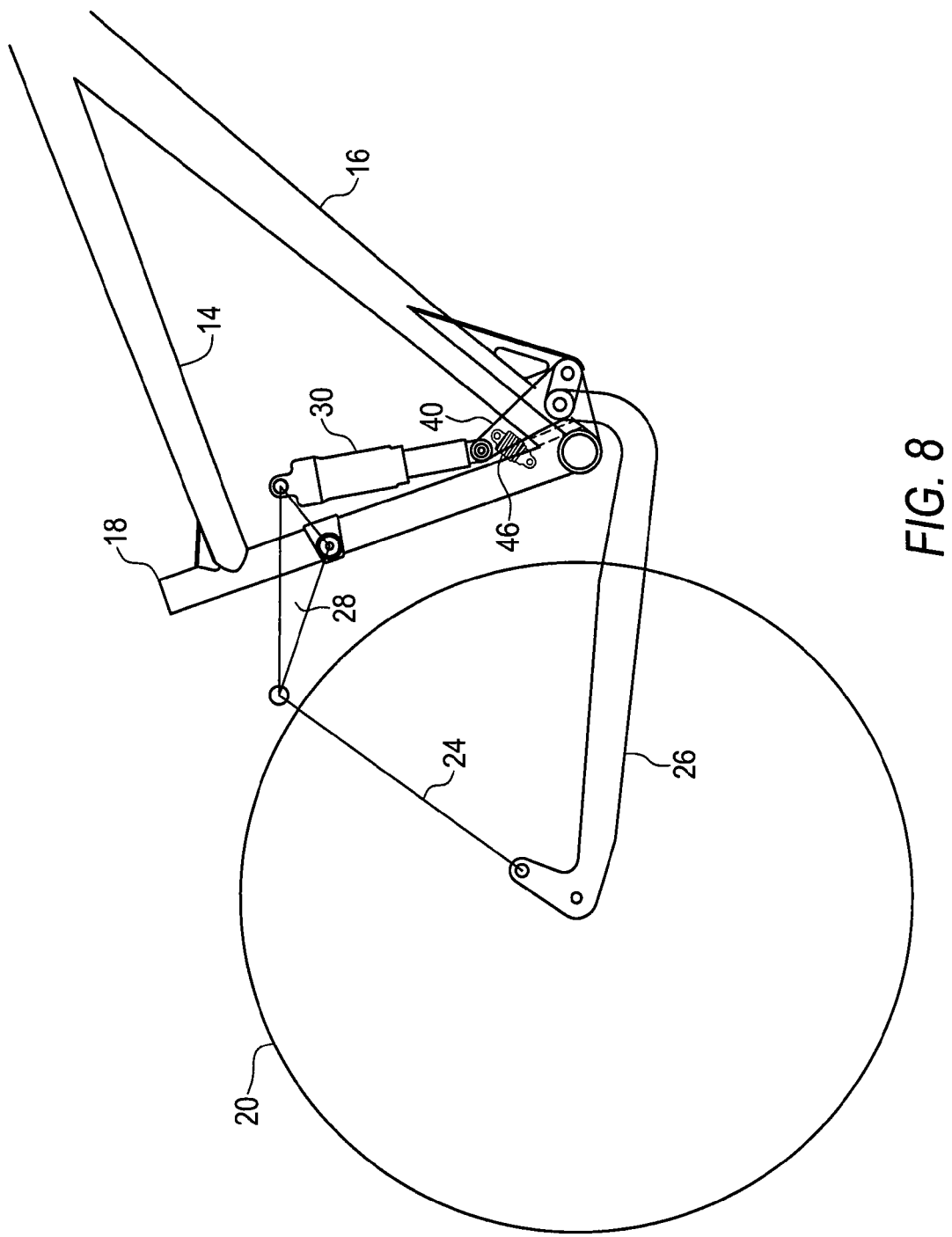
FIG. 8 is an elevation view showing the bicycle suspension of the invention under braking force with the suspension fully extended.

FIG. 8 illustrates a bump or braking force forcing chain stay 26 to the rear and pivoting the upper end of link 40 to the rear. This compresses spring 46. This also shows how this link 40 can also alter the geometry on a non-suspension bicycle, in response to acceleration and braking forces, if one considers the main shock absorber 30 as a rigid component or strut, with no telescopic shock absorbing motion.

Figure 9:
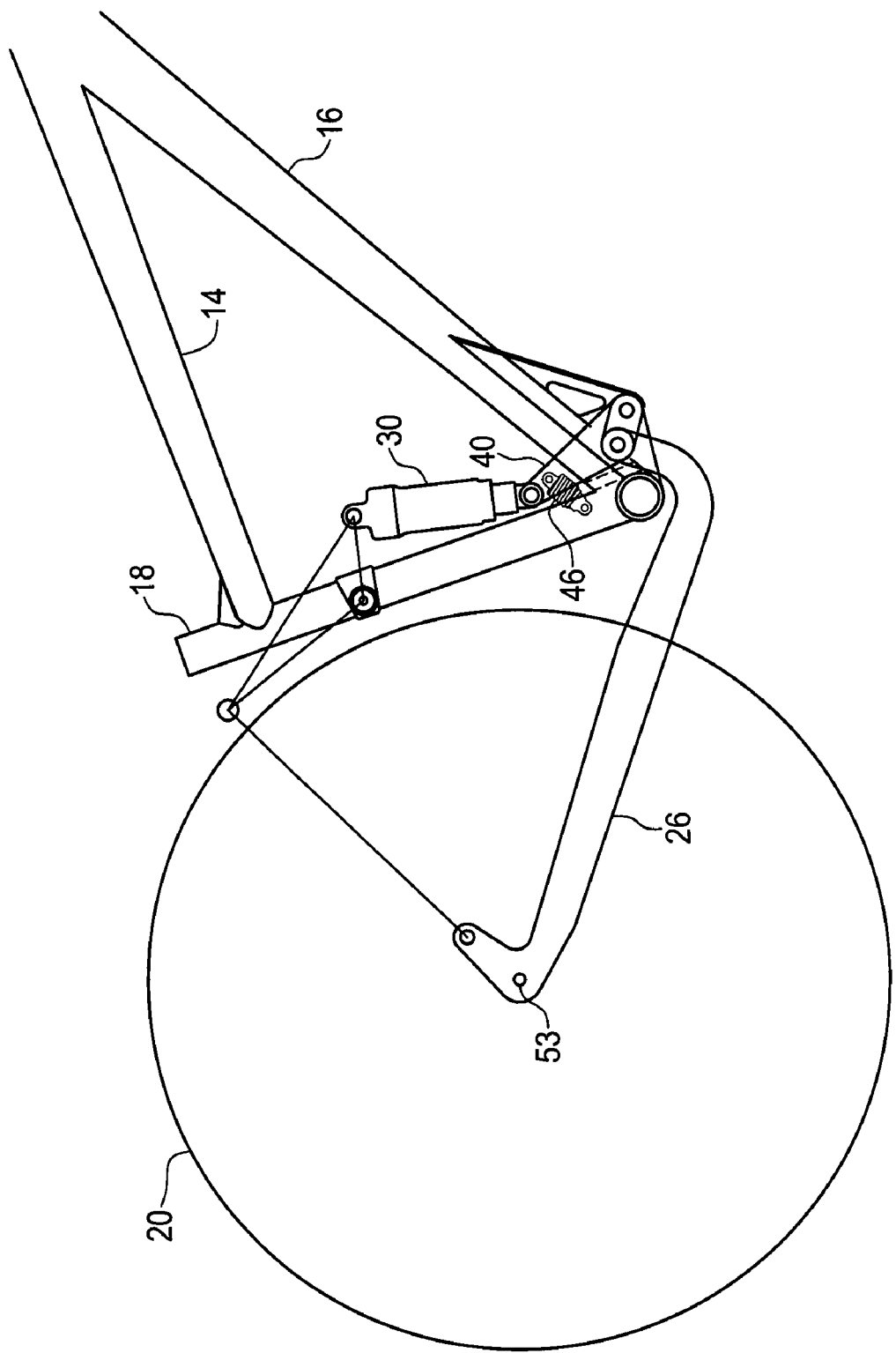
FIG. 9 is an elevation view showing the bicycle suspension of the invention under braking force with the main shock compressed due to a bump.
Figure 10:
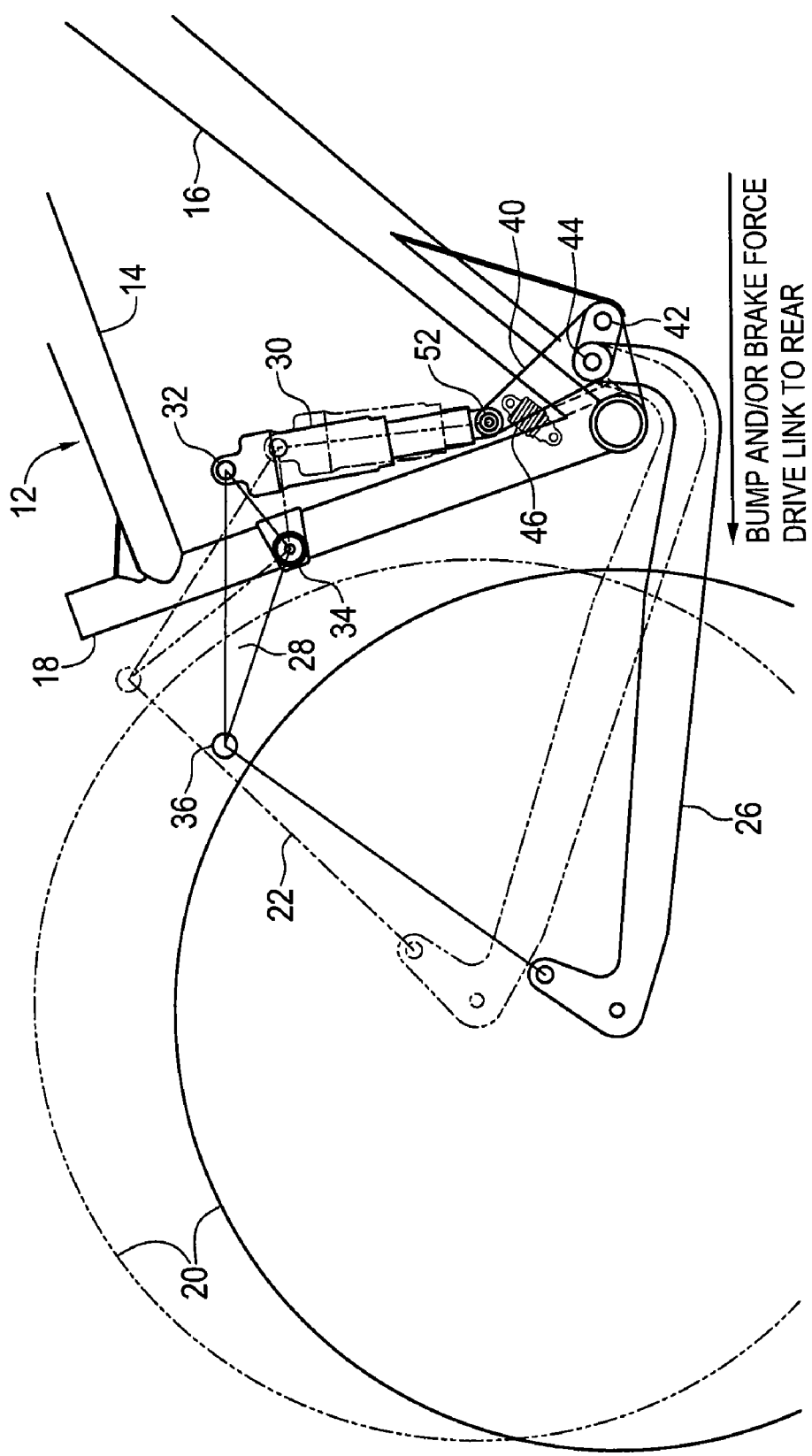
FIG. 10 is an elevation view showing the bicycle suspension of the invention under braking force with the main shock compressed due to a bump in phantom outline for comparison to the fully extended position.

FIGS. 9 and 10 show the bicycle suspension of the invention when an initial bump or braking force has moved the chain stay 26 and link 40 to the rear, and showing the effect of an additional bump force, in phantom outline in FIG. 10. As shown, a bump force or braking force is encountered where there is not forward pedal force. This bump force has a vertical component as well as a horizontal component, which pushes the wheel 20 to the rear. This in turn, pulls the swing arm 22, chan stay 26 and therefore the link 40 to the rear. When the link rotates to the rear, the lower shock mount 52 moves rearward and downward. This changes the motion ratio and rising rate characteristics of the shock 30 to be more progressive. This means the suspension will be more plush in the initial stages, to better absorb the bump, with a more aggressive rising rate for bottoming resistance. It also causes the fork angle and seat tube angle to relax, adding stability (especially at high speeds and/or descending), and shifting rider weight to the rear. The motion of the link 40 also provides additional wheel/suspension travel, to provide more bump absorption.

Under braking, this force is magnified, and the changes are more aggressive, making those benefits more pronounced, when they are needed most. The larger the bump force, or more aggressive the braking effort, the more the link 40 wants to rotate to the rear. During braking, the advantages of better bump absorption, more rearward rider weight bias and geometry changes result in much more rear wheel traction, allowing a much higher braking force from the rear wheel 20. During combined descending and braking over bumps, these advantages are magnified. High speed stability of the bicycle under braking is also enhanced due to the rearward weight transfer and less vertical fork rake angle.

When the link 40 rotates to rear, the changes in the shock motion ratio allow the rear wheel 20 to have more vertical travel for the amount of shock compression. This results in a suspension that has more travel available when it is needed most (i.e. hitting bumps), and less suspension travel when it is not needed (i.e. climbing). The result is two different suspension systems on one bike, as well as two different frame geometries on one bike. Both of these attributes change immediately and automatically in response to the forces acting on the bike. The rider need not make any adjustment for the changes to occur, just ride the bike and let the forces compensate for the conditions.

Figure 11:
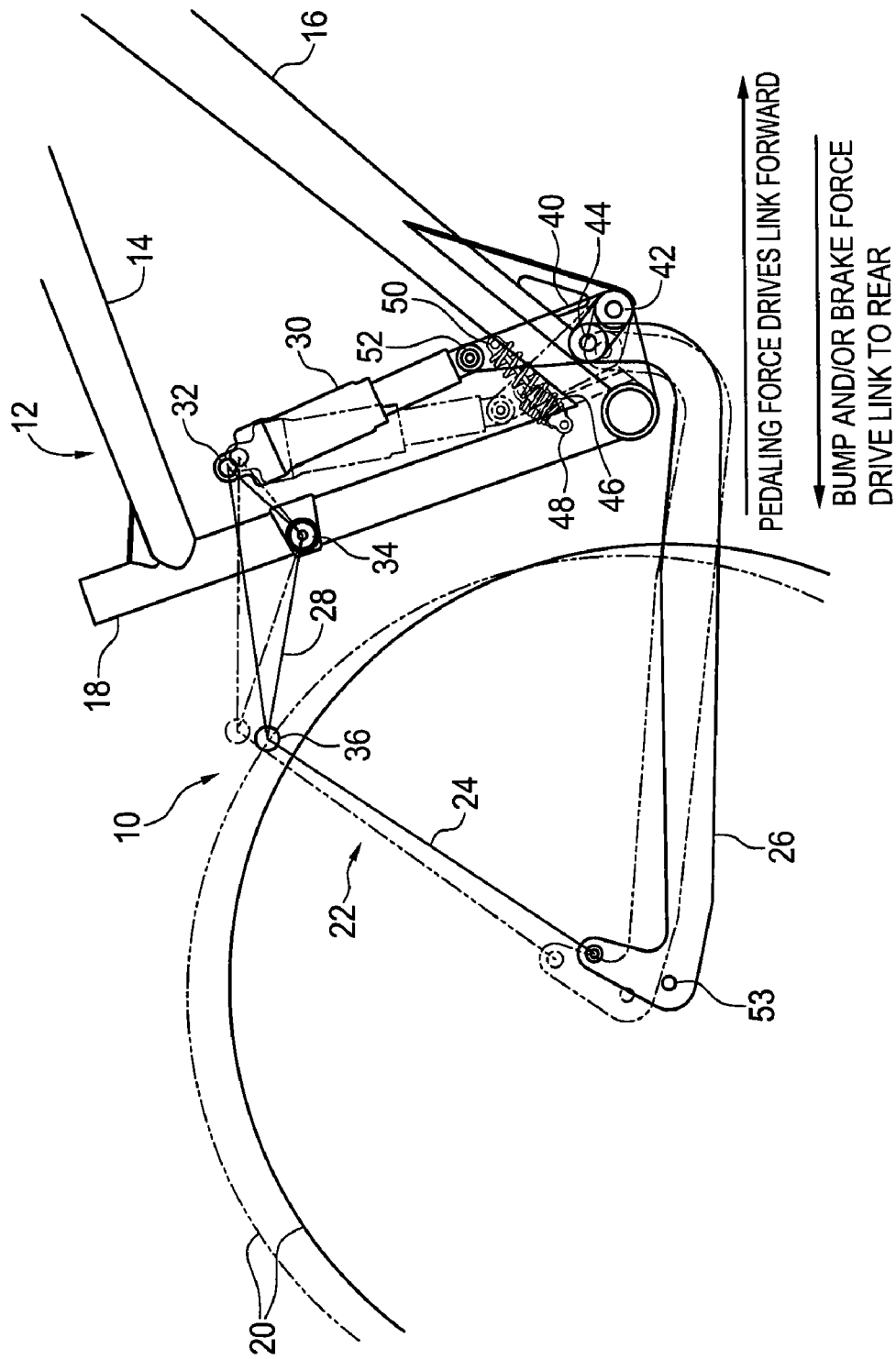
FIG. 11 is an elevation view showing the bicycle suspension of the invention under power or forward acceleration with the suspension fully extended and with the link moved to the rear shown in phantom outline for comparison.
Figure 12:
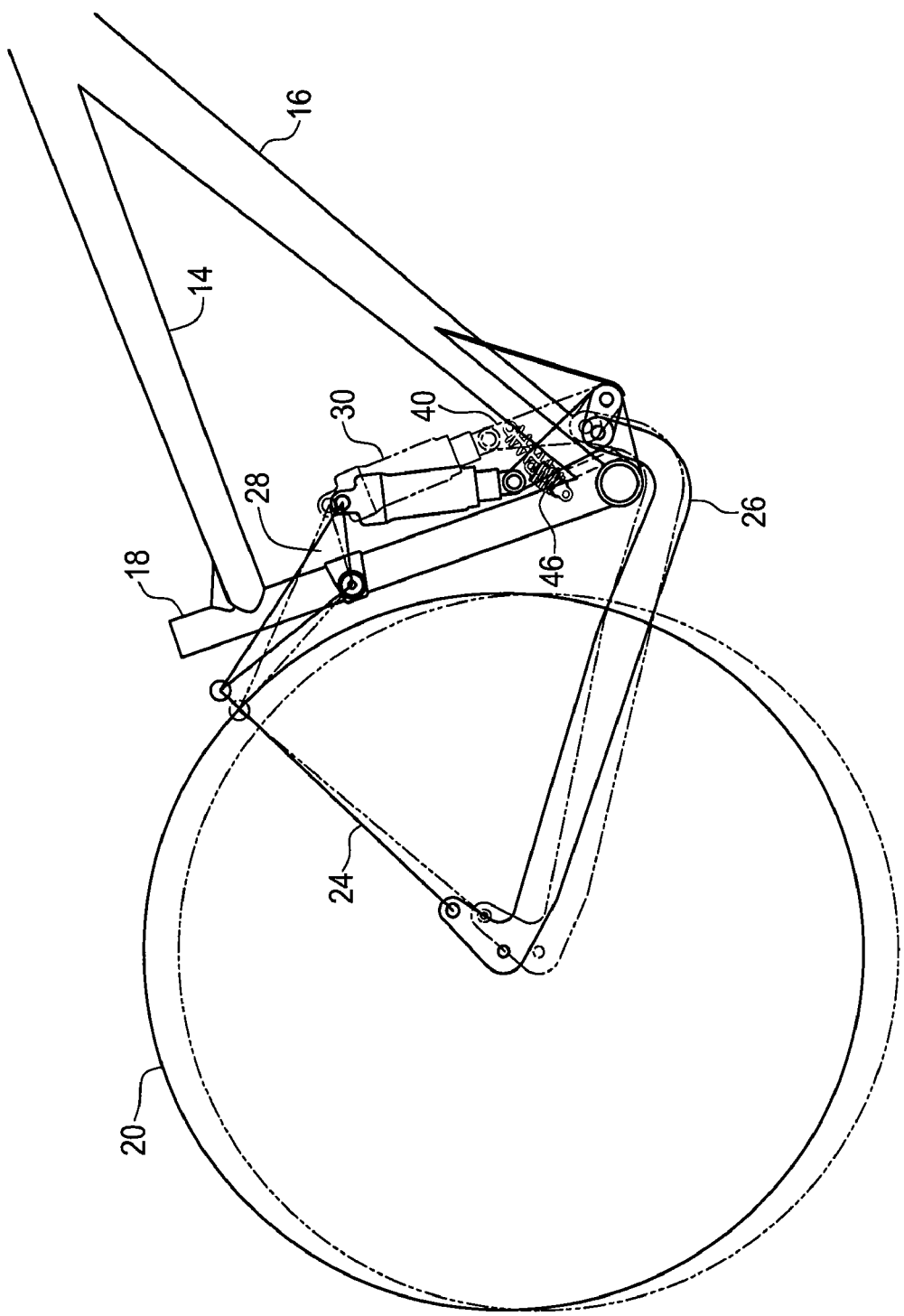
FIG. 12 is an elevation view showing the bicycle suspension of the invention under power or forward acceleration with the suspension compressed and with the link moved to the rear shown in phantom outline for comparison.
Figure 13:
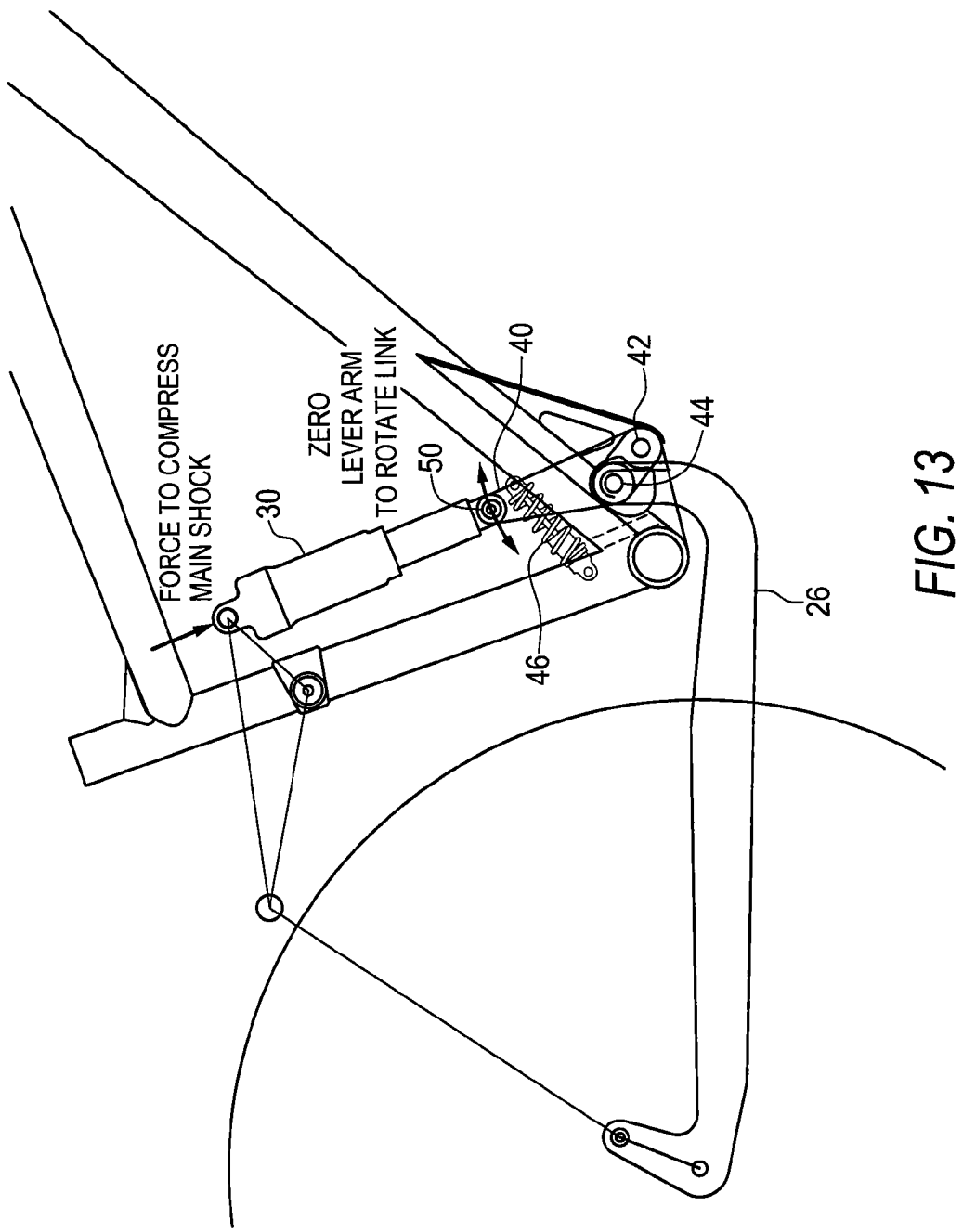
FIG. 13-16 are elevation views showing the bicycle suspension of the invention and illustrating the forces at play when the link is in different positions.

FIGS. 11 and 12 illustrate the comparison of the link in the forward and rear positions with the shock 30 extended (FIG. 11) and compressed (FIG. 12). In the preferred embodiment for bicycles, several force relationships are utilized to create the unique interactions. As shown in FIG. 13, the alignment of connecting pivot points in the link 40 can be manipulated such that, any initial spring force from the main shock 30 will have little to no leverage to activate the link 40 causing it to rotate, or compress the auxiliary shock/spring 46. By aligning the pivots 42, 44, 52 as shown, in a nearly straight line, the input spring force from the main shock 30 (mainly due to rider weight or vertical motion by the rider) is transmitted to the link 40 with the worst possible transmission angle and leverage for purposes of rotating the link. This means that all vertical input forces from the rider; i.e. static weight or pedaling input, have less ability to cause the link 40 to rotate to the rear, and the extra suspension 46 to be active. All of the resistance to vertical motion is therefore provided by the main shock/spring 30, which is, by definition, a higher effective spring rate than when the main spring and auxiliary spring are simultaneously deflected in series (as described below).

Figure 14:
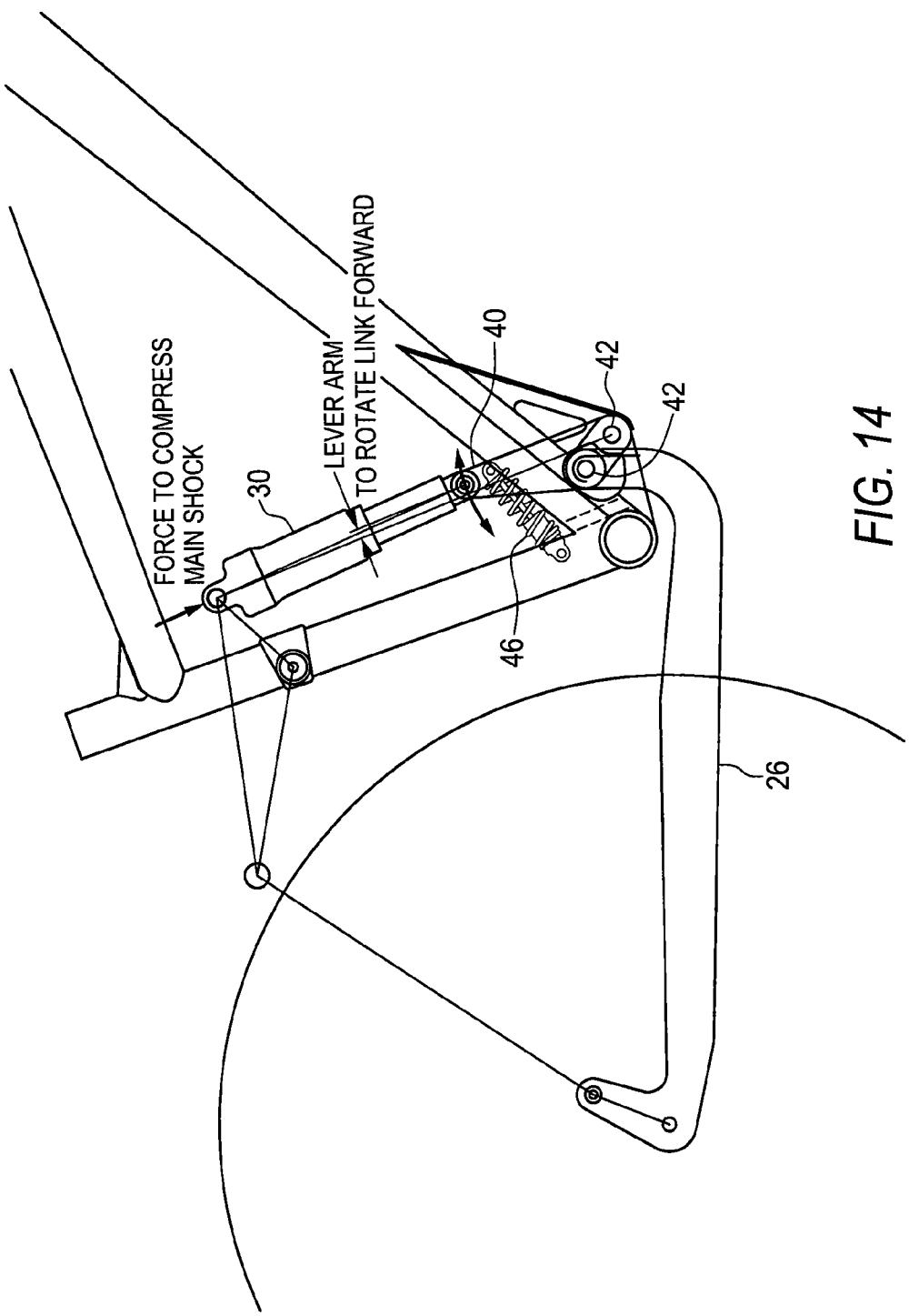

At one extreme, as shown in FIG. 14, the link 40 can rotate to the degree that the main shock force tries to rotate the link 40 further forward, further delaying/impeding the link's tendency to rotate to the rear under braking and/or bump forces. For example, this might be more desirable for a bike that was made specifically for climbing.

This alignment of pivots 42, 44, 52 can be geometrically configured to occur when the link is pushed to a forward position due to pedaling/forward acceleration forces. In these conditions, the link 40 will stay forward even when the rider's pedal input (and therefore forward acceleration force) varies with crank frequency. Without this alignment, the link 40 would tend to rotate whenever pedaling pressure was momentarily reduced. This link rotation would allow undesirable effects such as vertical chassis movement, soft/lazy forward acceleration response, less vertical fork and seat angle. These effects would cycle freely as those forces varied.

When a bump or rear brake application occurs, the horizontal force to the rear will pull the link 40 to the rear as shown in FIG. 15. This has several simultaneous effects. The rotation of the link changes the alignment of all the aforementioned pivot points, such as the lower spring mount 52 and the chainstay pivot 44, allowing the main shock 30 to gain a leverage advantage/transmission angle, at a point where the extra suspension and all of the other benefits are most needed.

An additional benefit is the ability to employ a different (softer) spring rate at the moment when a bump force requires it. When the link 40 is rotating, the auxiliary shock/spring 46 is compressing at the same time the main spring 30 is compressing. The resultant spring rate is a variation of two springs in series equation $1/k1+1/k2=1/ks$. This means that the effective spring rate of the suspension is lower/softer than either the main or auxiliary spring rates, as long as they are both being compressed simultaneously. This allows the most rapid response for the wheel to roll over the bump with the least resistance, and least reaction force input to the chassis/rider.

Thus it is possible to manipulate the force level required to rotate the link, allowing the ability to configure the link to suit various priorities, such as pure climbing or descending. The horizontal force input from the forward or rearward acceleration acting on the chain stay 26 can also be manipulated to modify its effect on the rotation of the link. The lever arm and angle of transmission both have an effect, as illustrated in FIG. 16.

While in the arrangements shown spring 46 biases the link towards a neutral, at rest position, the spring 46 could be selected and arranged to bias the link to a forward or rear position also. Other biasing means such as pads or bands of rubber or other resilient material, torsion springs, and the like can also be used.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A rear suspension for a bicycle, said bicycle comprising a frame and a rear wheel mounted for rotation on an axle mounted on a rearward end of a chain stay, said chain stay having a forward end, said rear suspension comprising:
    I) a linking element pivotally connected to said frame at a first pivot axis wherein the forward end of said chain stay is pivotally connected to said linking element at a second pivot axis on said linking element;
    ii) shock absorber having a lower end and an upper end, said shock absorber being pivotally connected at the lower end thereof to said linking element at a third pivot axis on said linking element; and
    iii) a biasing means connected to said frame at one end thereof and to said linking element at the other end thereof;
whereby said second pivot axis is thereby movable forwardly and rearwardly in relation to said frame in response to forward acceleration and rearward deceleration or braking forces respectively, thereby rotating said linking element about said first pivot axis and rotating said third pivot axis forwardly and rearwardly respectively about said first pivot axis thereby moving said third axis forwardly and rearwardly in relation to said frame.

2. The rear suspension of claim 1 wherein said biasing element is a spring urging said link element to a neutral position between forward acceleration and rearward deceleration or braking forces.

3. The rear suspension of claim 1 wherein said shock absorber is a rigid strut.

4. The rear suspension of claim 1 wherein said shock absorber is a spring.

5. The rear suspension of claim 4 wherein said chain stay is pivotally connected to a seat stay and the upper end of said shock absorber is pivotally connected to said seat stay.

6. The rear suspension of claim 4 wherein said chain stay is pivotally connected to a seat stay, the upper end of said seat stay is pivotally connected to a rocker arm which is pivotally mounted on said frame, and said the upper end of said shock absorber is pivotally connected to said rocker arm.

7. The rear suspension of claim 1 wherein said rearward end of said chain stay is pivotally connected to a seat stay and the upper end of said shock absorber is pivotally connected to said seat stay.

8. The rear suspension of claim 1 wherein said chain stay is pivotally connected to a seat stay, the upper end of said seat stay is pivotally connected to a rocker arm which is pivotally mounted on said frame, and said the upper end of said shock absorber is pivotally connected to said rocker arm.

9. The rear suspension of claim 1 wherein said biasing means is adapted to be selectively connected to said frame at said one end thereof at a plurality of locations.

10. The rear suspension of claim 9 wherein said biasing means is adapted to be selectively connected to said linking element at said other end thereof at a plurality of locations.

11. The rear suspension of claim 1 wherein said first, second and third pivot axes are so located that said shock absorber has a reduced degree of travel when said second pivot axis is moved forwardly in response to forward acceleration and an increased degree of travel when said second pivot axis is moved rearwardly in response to rearward deceleration or braking forces.

12. The rear suspension of claim 1 wherein said second pivot axis is located in a position between said first and third pivot axes on said linking element.

13. The rear suspension of claim 1 wherein said second pivot axis is located above said first pivot axis and below said third pivot axis on said linking element when said rear suspension is installed on a bicycle.

14. The rear suspension of claim 1 wherein said biasing means connects to said linking element at a location between said first and third pivot axes.

15. The rear suspension of claim 1 wherein said biasing means connects to said linking element at a location between said second and third pivot axes.

* * * * *